April 3, 1962 F. T. ROBERTS ETAL 3,028,276
METHOD OF MAKING A REINFORCED FLEXIBLE HOSE
HAVING INTERNAL AND EXTERNAL CORRUGATIONS
Filed Feb. 20, 1959 3 Sheets-Sheet 1

Fred T. Roberts,
Robert E. Roberts,
INVENTORS.

Fred T. Roberts,
Robert E. Roberts,
*INVENTORS.*

Fred T. Roberts,
Robert E. Roberts,
*INVENTORS.*

United States Patent Office 3,028,276
Patented Apr. 3, 1962

1

3,028,276
METHOD OF MAKING A REINFORCED FLEXIBLE HOSE HAVING INTERNAL AND EXTERNAL CORRUGATIONS
Fred T. Roberts and Robert E. Roberts, both of White Fences, Danbury Road, Wilton, Conn.
Filed Feb. 20, 1959, Ser. No. 794,602
8 Claims. (Cl. 156—144)

The present invention relates to a hose and to its method of manufacture.

It is an object of the present invention to provide a reinforced, flexible, elongate hose which is capable of being coiled when not in use without injury to the hose and which may be clamped to fittings without distorting the reinforcing members incorporated therein.

It is a further object of the present invention to provide a reinforced flexible hose having a high degree of flexibility and durability, which is due at least in part to the formation of internal and external corrugations or convolutions in the hose.

It is yet another object of the present invention to provide an elongate flexible hose which is corrugated both internally and externally and which, if desired, may have a fabric reinforcement embedded therein or incorporated on or adjacent to the surface thereof.

It is yet another object of the present invention to provide a method for the making for the manufacture of highly flexible, relatively light and durable hose particularly adapted for use with portable vacuum cleaners or in connection with exhaust systems where the outlet of the vacuum cleaning system is located in the baseboard of a room, or in the attic or basement of a home.

In accordance with the present invention, an elongated hose member having a relatively smooth molded outer surface is provided containing a plurality of circumferential substantially rigid reinforcements disposed therein and embedded in the elongated member in a predetermined spaced relationship so that the hose is reinforced throughout its length by the flexible reinforcing member. The hose in its normal finished condition is made in relatively long lengths with the reinforcements extending uniformly throughout the length of the hose. The reinforcing member is preferably in the form of a helically coiled spring member in which the convolutions are axially spaced in a predetermined manner. In addition, the hose may have incorporated therewith a fabric reinforcing layer which may be embedded within the hose body or bonded or embedded adjacent to or on the surface of the hose.

The present application is a continuation-in-part of applicants' copending application Serial No. 720,190, filed March 10, 1958, which is in turn a continuation-in-part of application Serial No. 621,093, filed November 8, 1956, now Patent No. 2,830,622. These previous applications describe the general method for the manufacture of a hose, which method is also utilized as the initial phase for the manufacture of the hose of the present invention. In the aforesaid prior applications, the hose is made by a novel method wherein a body of elastomeric material, preferably in sleeve or tubular form, is disposed on a mandrel on which it may be expanded. Reinforcements are then located on the exterior of the body and the mandrel is slightly expanded to cause the body to grip the reinforcements and hold them in place. Thereafter, the outer layer may be positioned over the reinforcements and tubular body. The outer layer may be of elastomeric material having wear resisting or other desired properties or can be of fabric impregnated with elastomeric material. The assembly is then removal from the mandrel and inserted into a mold having a cylindrical cavity, the ends of the body attached in an airtight manner to the end portions of the mold, and fluid under pressure applied to the interior of the hose so as to cause the outer layer to be pressed against the cavity of the mold to form a smooth cylindrical outer surface, while the body forming the interior of the hose is pressed into engagement with the reinforcements so as to embed the same therein and also pressed against the body forming the outer portion of the hose so as to become united thereto, at the same time forming a corrugated interior with the reinforcements embedded in spaced corrugations within the hose. The resulting product is one having a smooth exterior surface and corrugations or convolutions spaced along the interior surface of the hose.

In accordance with the present invention, applicants have developed a product having improved flexing characteristics and other desired properties by forming a hose having internal corrugations as described above but in which the outer surface thereof, while being smooth is also corrugated, said corrugations being formed on the outer surface of the hose, with additional internal corrugations formed internally between those previously present but without embedded reinforcements. This result is obtained by following the procedure in the aforementioned prior applications to provide a hose body having internal corrugations and a smooth cylindrical outer surface but which is in the partially vulcanized state, and thereafter forming surface corrugations in the manner described below while completing the vulcanization of the hose so that the resulting product is one in which the corrugations are formed both internally and externally of the hose.

The hose of the present invention is designed to be formed and utilized in relatively long lengths of several feet or greater and can be made in lengths as high as 25 to 50 feet depending upon the length of the mandrel used. Such hose is useful in connection with the transportation of fluids as for the filling of fuel oil tanks, for attachment to gasoline pumps, for attachment to vacuum cleaners or the like and many other uses where the hose of long length is desired. The hose referred to may readily be formed with fabric reinforcements embedded therein as described below.

Other features and advantages of the invention will be apparent from the specification and claims when considered in connection with the drawing, in which:

In accordance with the present invention, a preformed tubular hose body 20 of elastomers material, such as vulcanizable rubber or synthetic rubber composition or a body of elastomeric plastic material, such as polyvinyl chloride is utilized. When a vulcanizable rubber composition is used, the material is set by vulcanization; while in using an elastomeric thermoplastic material, such as polyvinyl chloride, the material is set by cooling after the body material has been heated to a point above the softening temperature.

Figure 1:
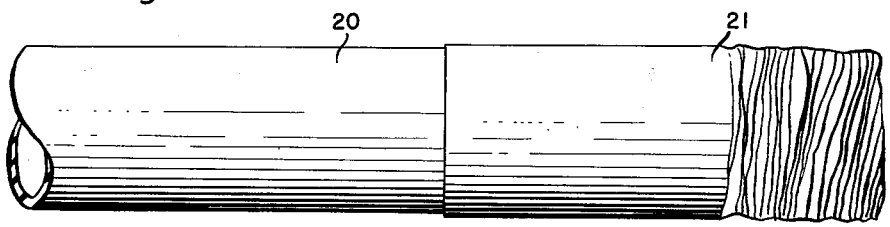
FIGURE 1 is a view in elevation illustrating the assembly of a hose body with reinforcing fabric thereon.
Figure 2:
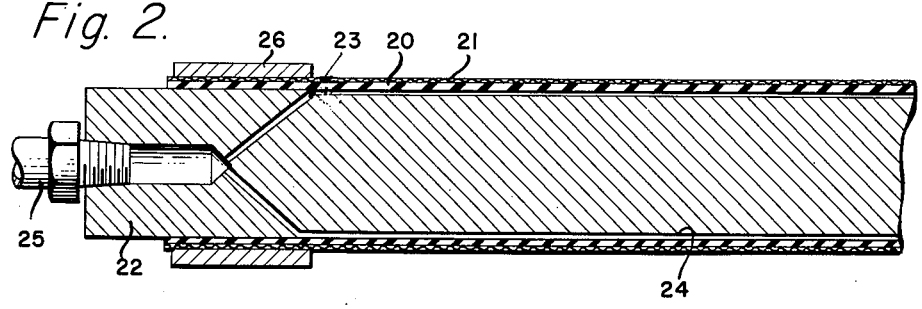
FIG. 2 is a view in longitudinal transverse cross section illustrating the assembly of the hose body upon a mandrel upon which the hose is to be formed.

The tubular member is preferably formed by extrusion to the desired length, diameter and thickness. Alternatively, the tubular body may be formed from a sheet, the edges of which are overlapped and joined by means of an adhesive or otherwise. Over this tubular member, a layer of open mesh fabric 21 such as an open mesh braided material produced in a braiding machine or similar open mesh fabric is drawn as illustrated in FIG. 1. Where fabric reinforced hose is not desired, this fabric layer may be omitted. The tubular body with this fabric layer is then positioned over an elongated mandrel 22 as shown in FIG. 2. The mandrel is preferably provided with longitudinal surface channels 24 communicating with passages 23 which in turn communicates with a fitting 25 connected to a source of air or stream under pressure. The ends of the tubular body are clamped against the mandrel by means of clamping members or rings 26 so that the space between the mandrel and the tube will be airtight.

Figure 3:
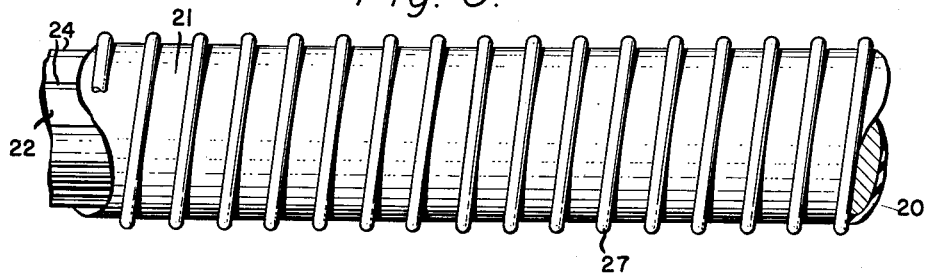
FIG. 3 is a view in elevation illustrating the assembly of a reinforcing member over the body portion of the hose on the mandrel.

In the next step of the process, reinforcing member 27 is positioned over the assembly of FIG. 2 as shown in FIG. 3. This reinforcing member is preferably in the form of a helical spring with spaced convolutions which may be wound around the surface of the tube or which may be preformed with the desired degree of spacing. Alternatively the spring member may be preformed with its coils closed together and then positioned over the tube on the mandrel and stretched longitudinally so that the coils will have the desired spacing, the ends thereof thereafter being taped down against the tube on the mandrel. In order to maintain the proper spacing of the convolutions after the spring is applied, tubular layer 20 may be expanded slightly against the inner surface of the spring by applying a slight degree of pressure against the interior of the tube by introducing air or other fluid under pressure through fitting 25 and passages 23 and channels 24. The reinforcing member may be of bare steel wire, or may if desired be coated with a layer of elastomeric material which will be compatible with the material of the tubular member 20 in order to facilitate the bonding and embedding of the reinforcing member during setting or vulcanization.

Figure 4:
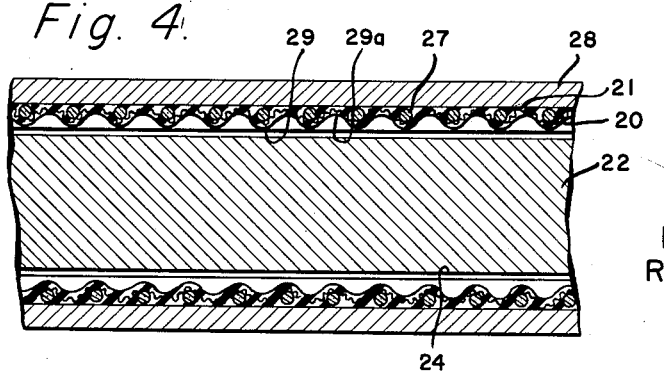
FIG. 4 is a longitudinal view in cross section illustrating the assembly of the hose body on the mandrel introduced into a cylindrical mold and forced against the interior of the mold cavity.

Thereafter, the assembly on the mandrel is introduced within a cylindrical mold member 28 as shown in FIG. 4 which may be in the form of a hollow pipe having a smooth interior surface or may be a two-part cylindrical mold. Air or steam under pressure is introduced internally of the tube 20 through inlet 25, passages 23 and channels 24 causing the tube to expand further and force it against the interior surface of the mold and around the convolutions of the reinforcing member. At the same time, heat is applied to the mold by introducing it into a heating chamber, or by the use of heated air or steam introduced internally of the tube, or both, causing the material of the tube to flow through the fabric reinforcement and conform to the surface of the mold. Fluid under pressure and heat is applied until partial vulcanization or curing of the elastomeric vulcanizable material is effected and the mold then allowed to cool, after which the pressure is reduced and the mandrel and tube withdrawn from the mold. In the case of a vulcanizable rubber compound, temperatures ranging from about 275° to 350° F. for a period of ten minutes will generally be sufficient to effect a partial vulcanization. Where thermoplastic material of the type of polyvinyl chloride is used, the assembly may be heated under a few pounds internal pressure at 250° to 350° F. to cause the material to conform to the surface of the mold and embed the convolutions of the reinforcement and the fabric, and the assembly is then allowed to cool. The foregoing procedure conforms substantially to that set forth in the aforesaid patent applications with the exception that the final assembly at this point is not completely cured except in the case of thermoplastic materials, such as polyvinyl chloride, which retains its thermoplastic properties in further processing as described below.

The resulting product, which is shown in position in the mold in FIG. 4 is an elongated smooth surfaced hose body in which reinforcing member 27 has become embedded in the elastomeric material and in which internal corrugations 29 have been formed as the result of the internal pressure which has been applied. Furthermore, the fabric reinforcing member 21 has also become embedded in the elastomeric material which has been forced through the fabric and against the surface of the mold. The fabric has been formed into a convoluted configuration conforming to the corrugations of the inner surface due to the fact that the fabric is restrained by the reinforcements and forced upward therebetween.

Figure 5:
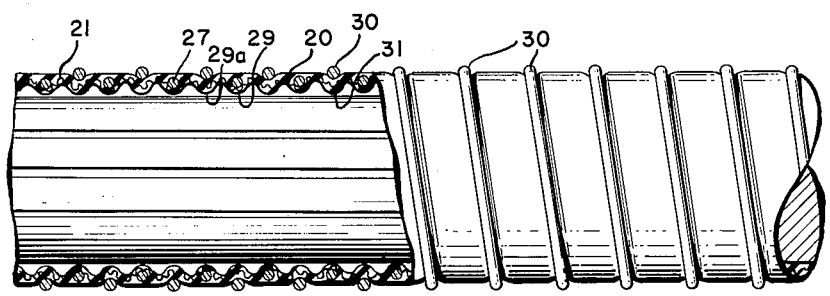
FIG. 5 is a view partly in elevation and partly in cross section illustrating the hose body formed in FIG. 4 in the first stage of fabrication into applicants' new product.
Figure 8:
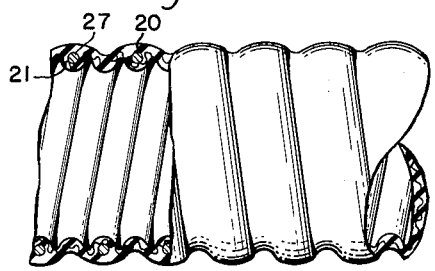
FIG. 8 is a view partly in cross section and partly in elevation illustrating the structure of the final hose product made according to FIG. 5.

The partially vulcanized tubular assembly while still on the mandrel is removed from the mold and subjected to further treatment in order to form the external corrugations referred to above. As shown in FIG. 5, the partially vulcanized hose body, while still on the mandrel, is further modified to form external corrugations and the second set of internal corrugations and depressions between the convolutions of the embedded reinforcing member, by wrapping the tubular body externally between the reinforcement turns with a cord or wire 30. The cord may have the same or a greater or smaller diameter than the diameter of the reinforcement and is wrapped sufficiently tightly around the tube to depress the portion of the hose body between the reinforcement turns down toward and preferably to the surface of the mandrel. In this way as shown in FIG. 5, the assembly consists of mandrel 22, tubular body 20, fabric 21 embedded therein, reinforcement member 27 also embedded in the tubular body, internal corrugations or depressions 29, formed internally of the tube and in which the reinforcements are embedded, outer cord or wire wrapping 30 and corresponding internal depressions defining corrugations 31. While in this state the assembly is then vulcanized to complete the procedure by introducing it into a heated chamber and continuing the vulcanization at a temperature of 275° to 350° F. for an additional 20 to 40 minutes or so depending upon the exact nature of the vulcanizable compound. After the cord or wire 30 is removed, the final product will have the structure illustrated in FIG. 8. Preferably, steam or heated air for the vulcanization is also introduced under pressure through the mandrel during vulcanization or curing so that a certain amount of internal pressure is built up within the tubular body. This produces a refinement or modification of the internal structure of the hose as illustrated in the enlarged view shown in FIGS. 13 and 14.

Figure 13:
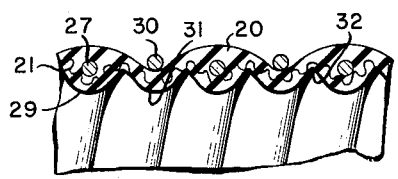
FIGS. 13 and 14 illustrate enlarged across sectional views of a portion of FIG. 8.
Figure 14:
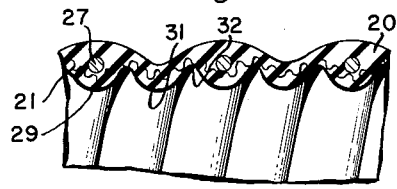

It is sometimes desirable to draw a slight vacuum on the mandrel in order to form depressions between the reinforcing turns of the hose body prior to the application of a cord. This serves as a guide to insure proper positioning of the cord between the convolutions between the reinforcing turns. The effect of carrying out the vulcanization at this stage under internal pressure is illustrated in FIGS. 13 and 14. As shown in FIG. 13, when cord 30 is applied and the hose body drawn downward between the reinforcement turns a slight pinching occurs in the corrugation, in the area 32 between the depressed areas 29 and 31 with the result that a uniform internal curvature at this point is not obtained. When pressure is applied internally of the hose during vulcanization, the resulting forces tend to cause a slight elongation to occur between convolutions, at the same time causing area 32 between 29 and 31 to assume a greater degree of curvature thus eliminating the sharp crease or pinch which is shown in FIG. 13. Pressures from 5 to about 25 pounds per square inch are found to be adequate for this purpose. In using elastomeric thermoplastic materials, such as polyvinyl chloride, the internal pressure applied should be kept fairly low, generally not to exceed about 5 pounds per square inch.

Figure 6:
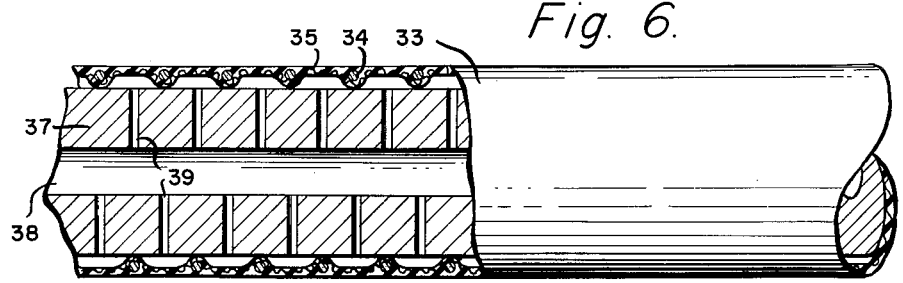
FIG. 6 is a view partly in elevation and partly in cross section illustrating another method of forming external corrugations into the hose body formed in FIG. 4.
Figure 7:
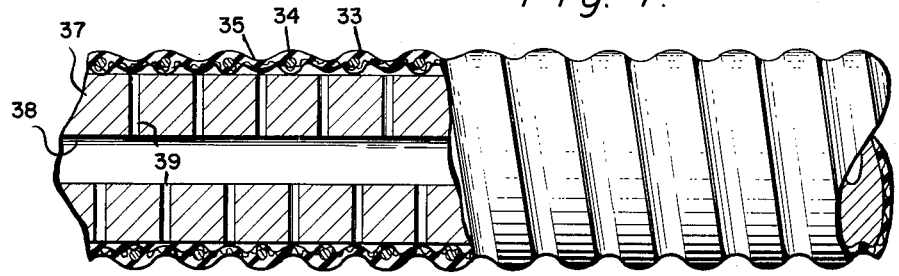
FIG. 7 is a view partly in elevation and partly in cross section illustrating a further stage in the formation of external corrugations subsequent to that illustrated in FIG. 6.

A modified procedure for obtaining the product of the invention is illustrated in FIGS. 6 and 7. As shown in FIG. 6, a smooth surfaced hose body which is in a partially vulcanized state as produced in accordance with the procedure illustrated in FIGS. 1 to 4 is removed from the mandrel 20 and positioned upon mandrel 37. This mandrel is provided with an internal bore 38 and radially extending passages 39 which are so spaced that they will conform substantially to a position midway between the respective convolutions of the hose body when it is placed in the mandrel. The hose body referred to consists of elastomeric body portion 33, spaced reinforcements 34 and embedded fabric 35. Vacuum is then applied internally to the mandrel and the hose body drawn downward between convolutions to form an internally and externally corrugated structure illustrated in FIG. 7. This replaces the use of cord as shown in FIG. 5. While maintaining this vacuum, the assembly is introduced into a heating chamber and vulcanization completed in a manner described above. Upon the completion of vulcanization, the vacuum is released and the hose is removed from the mandrel. Removal may be facilitated by introducing air under pressure to cause a slight degree of expansion of the hose body to enable it to be more easily removed from the mandrel. The resulting product will have the structure illustrated in FIG. 9, which is quite similar to that shown in FIG. 8.

Figure 10:
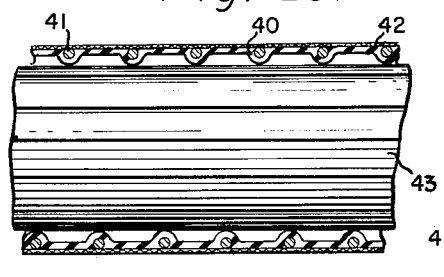
FIG. 10 is a view partly in cross section and partly in elevation illustrating an intermediate stage in the manufacture of a modified type of hose made in accordance with this invention incorporating a layer of fabric adjacent to the surface thereof.
Figure 11:
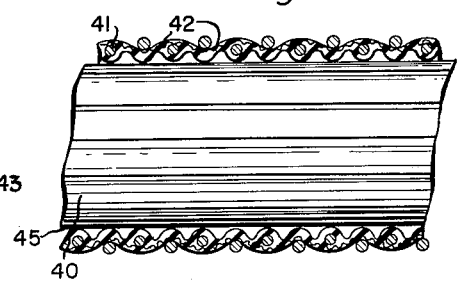
FIGS. 11 and 12 illustrate in cross section two final stages in the manufacture of the modified form of the invention.
Figure 12:
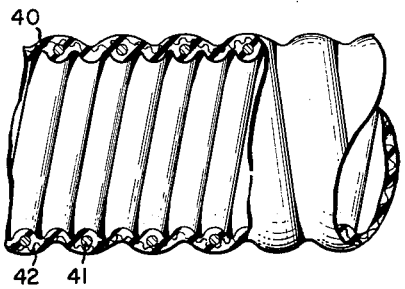

A modified form of the invention is illustrated in FIGS. 10, 11 and 12. In this construction, it is desired to produce a hose having a fabric layer at or close to the surface.

As shown in FIG. 10, a tubular vulcanizable or thermoplastic elastomeric hose body 40 of the type described above is positioned over mandrel 43 which may be of the type illustrated in FIG. 2. Reinforcement turns 41 are then applied over the tube body, and over the reinforcement is applied a layer fabric 42. This may be a layer of braid which is braided directly on to the hose over the reinforcement in a conventional braiding machine or may be a layer of fabric wrapped and overlapped over the reinforcement or may be a preformed tubular fabric. Since this fabric is applied at the surface of the hose, it need not necessarily be of the open mesh type described in connection with FIGS. 1 to 4 since it is not necessary to drive the material of the tube through the fabric to any great extent. Of course, an open mesh fabric may be utilized if desired. The resultant assembly is then introduced into a cylindrical mold cavity as described in connection with FIG. 4 and expansion and semi-curing carried out in the same manner as described above with the result that partial vulcanization or semi-curing of elastomeric material takes place with the formation of a smooth surfaced product. The structure of this product is illustrated in FIG. 10. When a fairly close mesh tubular fabric is utilized, a mold is not absolutely necessary since the fabric will be sufficiently strong to form the mold and retain the cylindrical structure desired when heated air is introduced into the mandrel to expand the elastomeric material into engagement with the fabric. However, it is preferable to use a mold so that there can be no surface irregularities and to insure suitable embedding of the fabric in the surface. This is particularly true when a thermoplastic material, such as polyvinyl chloride, is utilized which can flow under a slight degree of pressure as long as temperatures above the softening point are utilized. When vulcanizable materials such as rubber are used, however, it is generally preferred to utilize a mold. The resulting product as produced in accordance with FIGS. 10 and 11, is one in which a layer of fabric is embedded at or close to the surface of the tubular body which while being smooth to conform to the surface of the mold cavity will still show the pattern structure of the fabric. At this point the hose is corded down in the manner illustrated in FIG. 5 to form intermediate depressions and external corrugations and thereafter vulcanized to complete the cure as described above. The resulting product is illustrated in FIG. 12 and is one which conforms substantially to that shown in FIG. 8 with the exception that fabric 42 is embedded at the outer surface of the hose. Where internal steam or air pressure is utilized during the vulcanization, a further refinement of the internal structure of the hose which would conform to that illustrated in FIG. 14 is obtained.

Figure 9:
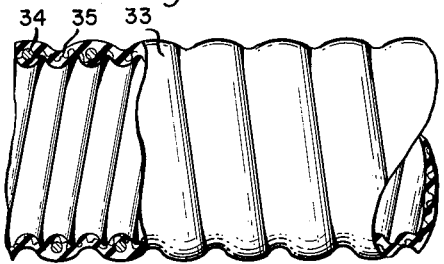
FIG. 9 is a view partly in cross section and partly in elevation illustrating the final form of the product made according to FIG. 7.

If desired, instead of utilizing cording to obtain the intermediate corrugations, vacuum may be applied in the manner described in connection with FIGS. 6 and 7 in which case the product will be substantially that shown in FIG. 9 with the exception of the position of the fabric which is adjacent to or at the outer surface of the hose.

If desired also, a plurality of layers of fabric may be utilized, for example, a layer of open mesh fabric of the type described in connection with FIGS. 1 to 4 may be applied beneath the reinforcing turns and a second layer of fabric applied over the reinforcing turns with the result that the open mesh fabric will become embedded within the hose body beneath the reinforcing turns and the second layer of fabric, which may be of a close mesh and ornamental type will be embedded or anchored at the surface of the hose.

We claim:

1. The method of forming a reinforced elongated hose member having internal and external corrugations which comprises forming an at least partially uncured hose body comprising elastomeric material having a substantially smooth cylindrical outer surface and internal corrugations with spaced depressed convolutions having reinforcements embedded therein, forcing portions of the cylindrical hose body inwardly between said reinforcements to form additional depressed convolutions between said first named convolutions, and completing the curing of said elastomeric hose body while it is in the last-named condition.

2. The method of forming a reinforced elongated hose member having internal and external corrugations which comprises applying a tubular layer of elastomeric material over a mandrel, positioning spaced reinforcing members on said layer of elastomeric material, inserting the assembly into a cylindrical mold cavity, applying fluid pressure to the interior of the body to press the tubular layer outwardly into firm engagement with the wall of the mold cavity and between the reinforcements to form a reinforced hose having a smooth cylindrical molded outer surface and a corrugated inner surface and setting the elastomeric material in an at least partially uncured condition, applying pressure to the outer surface of the resultant hose body between said reinforcements to force the hose body inwardly between said reinforcements to form additional depressed convolutions between said first named convolutions, and completing the setting and final curing of said elastomeric material while continuing the application of said pressure.

3. A method according to claim 2 wherein an open mesh fabric is applied over the surface of the elastomeric tubular layer prior to the application of the reinforcing members thereover whereby it will become embedded beneath the reinforcement.

4. A method according to claim 2 wherein a layer of fabric is applied over the reinforcing members after their application to the tubular hose body and wherein the fabric layer becomes embedded in the body adjacent the surface of the tubular layer during the forming of the body in the cylindrical mold.

5. A method according to claim 2 wherein the positioning of the reinforcing members comprise the step of inserting a continuous helical spring comprising spaced convolutions over the layer of elastomeric material.

6. A method according to claim 2 wherein the hose body is forced inwardly between reinforcements by means of an outer cord applied between said convolutions under tension.

7. A method according to claim 2 wherein the hose body is forced inwardly by means of differential pressure obtained by the application of vacuum internally of the hose body.

8. A method according to claim 6 wherein pressure is applied internally of the hose body during the final curing step in order to equalize the contours of the corrugations.

References Cited in the file of this patent

UNITED STATES PATENTS

| | | |
|---|---|---|
| 132,006 | Harris | Oct. 8, 1872 |
| 2,707,492 | Harris et al. | May 3, 1955 |
| 2,739,616 | Duff | Mar. 27, 1956 |
| 2,780,274 | Roberts et al. | Feb. 5, 1957 |
| 2,895,001 | Noyes et al. | July 14, 1959 |
| 2,897,840 | Roberts et al. | Aug. 4, 1959 |

UNITED STATES PATENT OFFICE

CERTIFICATE OF CORRECTION

Patent No. 3,028,276            April 3, 1962

Fred T. Roberts et al.

It is hereby certified that error appears in the above numbered patent requiring correction and that the said Letters Patent should read as corrected below.

Column 1, line 71, for "removal" read -- removed --; column 3, line 15, for "elastomers" read -- elastomeric --; same column, line 38, for "stream" read -- steam --.

Signed and sealed this 24th day of July 1962.

(SEAL)
Attest:

ERNEST W. SWIDER
Attesting Officer

DAVID L. LADD
Commissioner of Patents